(12) United States Patent
Nakamura

(10) Patent No.: US 11,566,947 B2
(45) Date of Patent: Jan. 31, 2023

(54) TEMPERATURE ESTIMATION SYSTEM, TEMPERATURE ESTIMATION METHOD, AND RECORDING MEDIUM STORING TEMPERATURE ESTIMATION PROGRAM

(71) Applicant: SHISEIDO COMPANY, LTD., Tokyo (JP)

(72) Inventor: Hitoshi Nakamura, Tokyo (JP)

(73) Assignee: SHISEIDO COMPANY, LTD., Tokyo (JP)

( * ) Notice: Subject to any disclaimer, the term of this patent is extended or adjusted under 35 U.S.C. 154(b) by 981 days.

(21) Appl. No.: 16/328,008

(22) PCT Filed: Aug. 23, 2017

(86) PCT No.: PCT/JP2017/030050
§ 371 (c)(1),
(2) Date: Feb. 25, 2019

(87) PCT Pub. No.: WO2018/043232
PCT Pub. Date: Mar. 8, 2018

(65) Prior Publication Data
US 2019/0195699 A1 Jun. 27, 2019

(30) Foreign Application Priority Data
Sep. 2, 2016 (JP) .............................. JP2016-172246

(51) Int. Cl.
*G01K 7/00* (2006.01)
*G01K 7/42* (2006.01)
(52) U.S. Cl.
CPC ................ *G01K 7/00* (2013.01); *G01K 7/42* (2013.01); *G01K 2217/00* (2013.01)

(58) Field of Classification Search
CPC .......... G01K 7/00; G01K 7/42; G01K 2217/00
See application file for complete search history.

(56) References Cited

U.S. PATENT DOCUMENTS 9,439,027 B2    9/2016 Yokota et al.
9,966,783 B2 *  5/2018 Sacchetti ............... G01K 13/00
(Continued)

FOREIGN PATENT DOCUMENTS

CN     104729748      6/2015
JP     2012-198715    10/2012
(Continued)

OTHER PUBLICATIONS

International Search Report for PCT/JP2017/030050 dated Nov. 14, 2017.
Chinese Office Action for 201780053191.X dated Mar. 4, 2020.

*Primary Examiner* — Mohamed Charioui
*Assistant Examiner* — Christine Y Liao
(74) *Attorney, Agent, or Firm* — IPUSA, PLLC

(57) ABSTRACT

A temperature estimation system includes an internal temperature data obtainer that obtains internal temperature data of a smartphone carried by a user; an operation data obtainer that obtains operation data on an operation state of the smartphone; and a temperature estimator that calculates an estimated value of an external temperature in a vicinity of the smartphone from the internal temperature data and the operation data of the smartphone, based on correlation among internal temperature data of a mobile terminal device for measurement, operation data on an operation state of the mobile terminal device for measurement, and actual temperature data that represents an actual environmental temperature in a vicinity of the mobile terminal device for measurement.

14 Claims, 13 Drawing Sheets

(56) References Cited

U.S. PATENT DOCUMENTS

| | | | | |
|---|---|---|---|---|
| 2003/0064749 A1* | 4/2003 | Soini | .................... | H04M 1/21 |
| | | | | 374/E7.042 |
| 2014/0114624 A1* | 4/2014 | Buchanan | ............... | G01W 1/02 |
| | | | | 703/2 |
| 2015/0177076 A1* | 6/2015 | Claus | .................... | G01K 7/42 |
| | | | | 374/152 |

FOREIGN PATENT DOCUMENTS

| | | | | |
|---|---|---|---|---|
| JP | 2015-015600 | | 1/2015 | |
| JP | 2015-534038 | | 11/2015 | |
| JP | 2016-099282 | | 5/2016 | |
| KR | 2005082944 A | * | 8/2005 | .......... H04M 1/7255 |
| WO | WO-2015154446 A1 | * | 10/2015 | ........ H04M 1/72569 |

* cited by examiner

| DATE AND TIME | ACTUAL TEMPERATURE DATA |
|---|---|
| d1 | at1 |
| d2 | at2 |
| : | : |

FIG.6

| DATE AND TIME | INTERNAL TEMPERATURE DATA | OPERATION DATA ||||
|---|---|---|---|---|---|
| | | CPU INFORMATION ||| VOLT |
| | | CPU1 | CPU2 | CPU3 | ... |
| d1 | it1 | xxx | xxx | xxx | ... | xxx |
| d2 | it2 | xxx | xxx | xxx | ... | xxx |
| : | : | : | : | : | : | : |

FIG.11

| STATE | | DATE AND TIME | ACTUAL TEMPER- ATURE DATA | INTERNAL TEMPER- ATURE DATA | OPERATION DATA 230 | | | | |
|---|---|---|---|---|---|---|---|---|---|
| OPERATION | ENVIRON- MENT | | | | CPU INFORMATION | | | | VOLT |
| | | | | | CPU1 | CPU2 | CPU3 | ... | |
| HIGH LOAD | HIGH TEMPER- ATURE | d1 | xxx | xxx | xxx | xxx | xxx | ... | xxx |
| | | d2 | xxx | xxx | xxx | xxx | xxx | ... | xxx |
| | | .. | .. | .. | .. | .. | .. | ... | .. |
| LOW LOAD | HIGH TEMPER- ATURE | d10 | xxx | xxx | xxx | xxx | xxx | ... | xxx |
| | | d12 | xxx | xxx | xxx | xxx | xxx | ... | xxx |
| | | .. | .. | .. | .. | .. | .. | ... | .. |
| .. | .. | .. | .. | .. | .. | .. | .. | ... | .. |

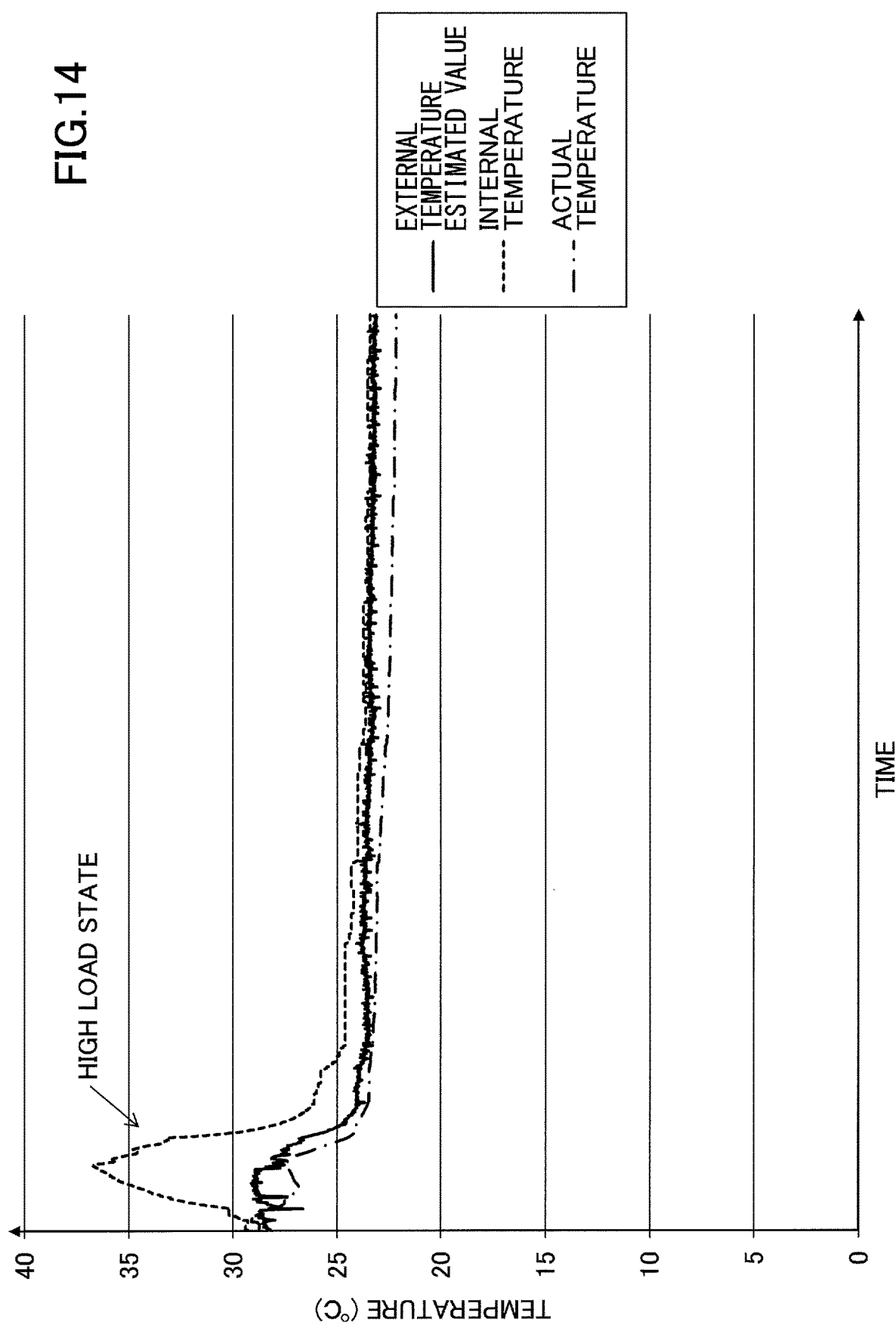

TEMPERATURE ESTIMATION SYSTEM, TEMPERATURE ESTIMATION METHOD, AND RECORDING MEDIUM STORING TEMPERATURE ESTIMATION PROGRAM

TECHNICAL FIELD

The present invention relates to a temperature estimation system, a temperature estimation method, and a recording medium storing a temperature estimation program.

BACKGROUND ART

A temperature at a location at which a user is located is useful information. There is a case in which a user may want to know the temperature, and a case in which a user may want to continuously obtain a temperature at a point at which the user is located for a predetermined time, for example, as environmental data related to skin.

In recent years, many people hold and carry mobile terminal devices, such as smartphones. In such a mobile terminal device, various sensors, such as an acceleration sensor and a gyro sensor, are standardly installed. Further, for example, Patent Document 1 describes a temperature sensor for measuring a temperature of an object whose contact is detected by a contact sensor.

Additionally, for example, for a smartphone operating on an Android (registered trademark) platform, various sensors are defined, such as an acceleration sensor (TYPE_ACCELEROMETER), a gyro sensor (TYPE_GYROSCOPE), and a temperature sensor (TYPE_TEMPERATURE, TYPE_AMBIENT_TEMPERATURE). Measured values by these sensors can be obtained by using an API, such as a sensor framework.

PRIOR ART DOCUMENTS

Patent Documents

Patent Document 1: Japanese Unexamined Patent Publication No. 2015-015600

SUMMARY OF THE INVENTION

Problem to be Solved by the Invention

A value measured by a temperature sensor, such as that described above, is, however, influenced by heating of a battery and a CPU, etc., installed inside a smartphone, so that an external temperature of the smartphone may not be accurately detected. As a result, when it is desirable to obtain the external temperature of the mobile terminal device, a user may be required to carry a thermometer separately and to measure the temperature with the thermometer.

Means for Solving the Problem

The present invention is achieved in view of the above-described circumstances, and an object is to provide a technique for accurately estimating an external temperature of a mobile terminal device using data that can be standardly obtained by the mobile terminal device, such as a smartphone.

According to the present invention, there is provided a temperature estimation system including an internal temperature data obtainer that obtains internal temperature data of a user mobile terminal device carried by a user; an operation data obtainer that obtains operation data on an operation state of the user mobile terminal device; and a temperature estimator that calculates an estimated value of an external temperature in a vicinity of the user mobile terminal device from the internal temperature data and the operation data of the user mobile terminal device, based on correlation among internal temperature data of a mobile terminal device for measurement, operation data on an operation state of the mobile terminal device for measurement, and actual temperature data that represents an actual environmental temperature in a vicinity of the mobile terminal device for measurement.

Advantageous Effect of the Invention

An external temperature of a mobile terminal device can be accurately estimated using data that can be standardly obtained by the mobile terminal device, such as a smartphone.

BRIEF DESCRIPTION OF THE DRAWINGS

FIG. 6 is a diagram illustrating an example of data stored in a measured data storage of a smartphone for measurement;

FIG. 11 is a diagram illustrating an example of the estimation formula calculation data according to an embodiment;

FIG. 14 is a diagram showing external temperature estimation values calculated in an embodiment.

EMBODIMENTS FOR IMPLEMENTING THE INVENTION

Figure 1:
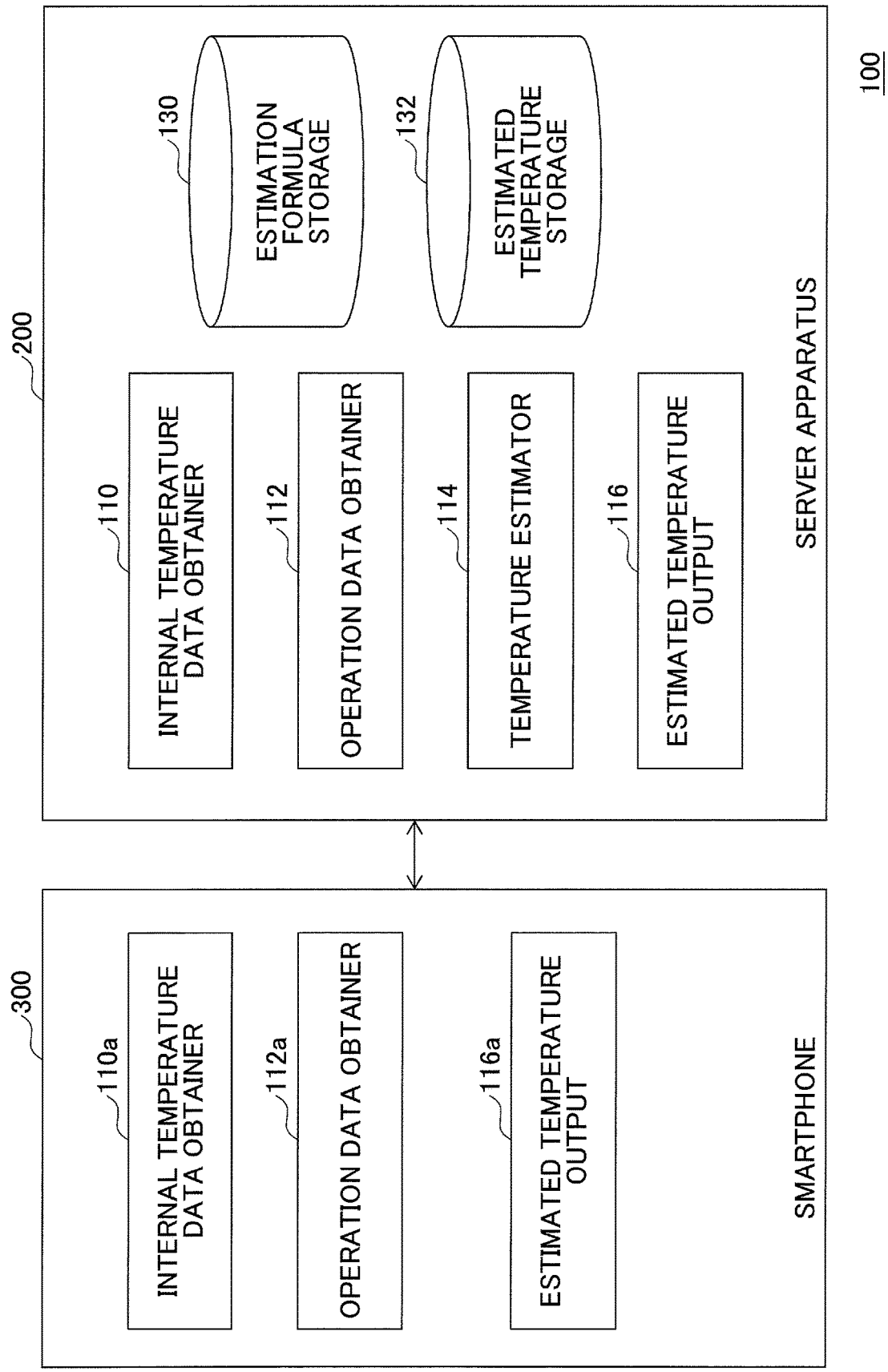
FIG. 1 is a block diagram illustrating an example of a functional configuration of a temperature estimation system according to an embodiment.

Embodiments of the present invention are described below using the drawings. Note that, in all the drawings, similar reference numerals are attached to similar components, and the description is omitted as appropriate.

In the embodiments, an object is to accurately estimate a temperature at a point at which a user is located (an external temperature of the mobile terminal device) only by using a mobile terminal device, such as a smartphone, carried by the user.

In general, a battery and a CPU are installed inside a mobile terminal device, such as a smartphone, and some temperature sensors for detecting overheating, etc., of the battery and the CPU are also installed inside. Accordingly, it is considered that the temperature measured by the temperature sensors installed inside the mobile terminal device can be detected. However, if, for example, a high load process is performed by a mobile terminal device, a temperature of the battery and the CPU rises, and the temperature measured by the temperature sensors installed inside the mobile terminal device becomes higher than the actual external temperature. Consequently, the external temperature of the mobile terminal device may not be accurately detected by the temperature sensors installed inside the mobile terminal device.

In the embodiments, a temperature (internal temperature data) measured by temperature sensors that are installed inside a predetermined mobile terminal device (a mobile terminal device for measurement), operation data on an operation state of the mobile terminal device, and actual temperature data representing an actual environmental temperature in a vicinity of the mobile terminal device are obtained, and correlation among these is calculated in advance. Then, internal temperature data measured by temperature sensors installed inside a mobile terminal device carried by a user (a user mobile terminal device) and operation data on an operation state of the mobile terminal device are obtained, and an estimation value of the external temperature in a vicinity of the mobile terminal device is calculated from the internal temperature data and the operation data, based on the correlation calculated in advance.

In the following embodiments, a case is described as an example, in which the mobile terminal device is a smartphone.

First Embodiment

FIG. 1 is a block diagram illustrating an example of a functional configuration of a temperature estimation system 100 in the embodiment.

In the embodiment, the functional configuration of the temperature estimation system 100 can be a configuration that is embedded in a server apparatus 200 that is connected to a smartphone 300 through a network. The temperature estimation system 100 includes an internal temperature data obtainer 110; an operation data obtainer 112; a temperature estimator 114; an estimated temperature output 116; an estimation formula storage 130; and an estimated temperature storage 132. The smartphone 300 includes, as functions, an internal temperature obtainer 110a; an operation data obtainer 112a; and an estimated temperature output 116a.

Figure 2:
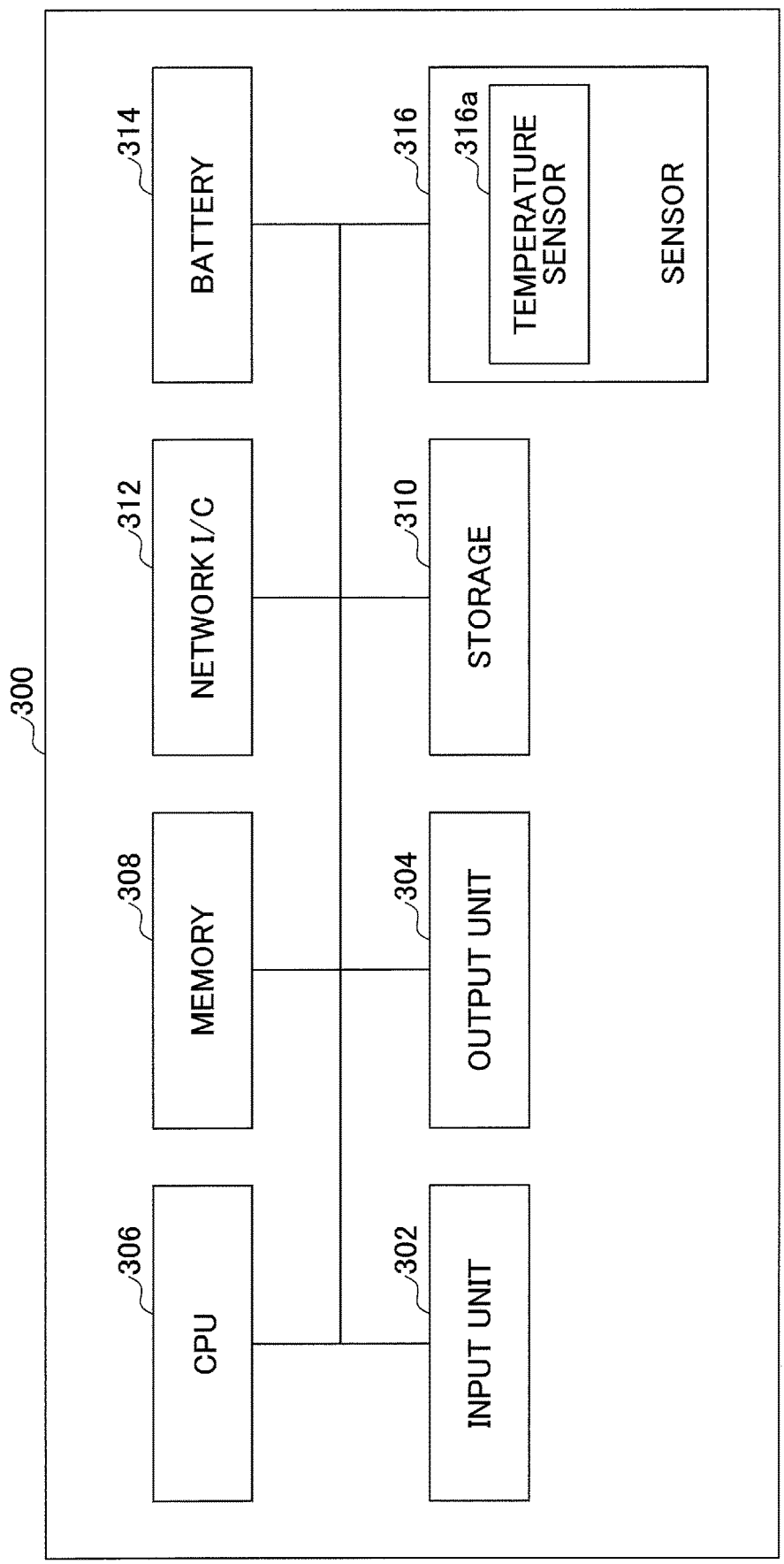
FIG. 2 is a block diagram illustrating an example of a hardware configuration of a smartphone according to an embodiment.

FIG. 2 is a block diagram illustrating an example of a hardware configuration of the smartphone 300 according to the embodiment.

The smartphone 300 includes an input unit 302; an output unit 304; a CPU (Central Processing Unit) 306; a memory 308; a storage 310; a network I/C 312; a battery 314; and a sensor 316.

The input unit 302 may be, for example, a button, a keyboard, etc., that are operated by a user, etc. The input unit 302 may be, for example, an audio input device that enables inputting through a voice, such as a microphone. The output unit 304 may be a speaker, a display, etc. The input unit 302 and the output unit 304 may be configured such that an input configuration and an output configuration are integrated, such as a touch panel.

The memory 308 stores a control program, such as an OS (Operating System), an execution program, etc. Here, the memory 308 is a ROM (Read Only Memory), a RAM (Random Access Memory), etc. The storage 310 may be a built-in storage, etc.

The CPU 306 implements a temperature estimation process according to the embodiment by controlling a process by the entire computer, such as various types of operations, inputting/outputting of data to/from each hardware component, etc., based on the control program and the execution program stored in the memory 308.

The network I/C 312 communicates data with another device, such as the server apparatus 200, by establishing a connection to a network, such as the Internet, a IAN, etc.

The battery 314 may be, for example, a lithium ion battery, etc., that may be generally installed inside a smartphone.

The sensor 316 includes various types of sensors that may be generally installed inside a smartphone, such as an acceleration sensor, a gyro sensor, etc. In the embodiment, the sensor 316 includes at least a temperature sensor 316a. The temperature sensor 316a is not particularly limited, provided that the temperature sensor 316a is installed inside the smartphone 300. For example, the temperature sensor 316a may be a temperature sensor for measuring a temperature (overheating) of the battery 314 and the CPU 306 installed inside the smartphone 300.

Note that the hardware configuration of the server apparatus 200 is also the same as the hardware configuration of the smartphone 300 illustrated in FIG. 2. However, the configuration of the server apparatus 200 may not include a temperature sensor. In the server apparatus 200, the storage may be an HDD (Hard Disk Drive), for example.

Referring back to FIG. 1, the internal temperature data obtainer 110a of the smartphone 300 obtains internal temperature data of the smartphone 300. The internal temperature data obtainer 110 of the server apparatus 200 retrieves, through a network, the internal temperature data of the smartphone 300 obtained by the internal temperature data obtainer 110a. The internal temperature data may represent the temperature measured by the temperature sensor 316a that is installed inside the smartphone 300. The internal temperature data obtainer 110 is capable of retrieving, for a predetermined time period, internal temperature data every constant time interval.

The operation data obtainer 112a of the smartphone 300 obtains operation data on an operation state of the smartphone 300. The operation data obtainer 112 of the server apparatus 200 retrieves, through a network, the operation data of the smartphone 300 that is obtained by the operation data obtainer 112a. The operation data may be, for example, an operation state of the CPU 306 installed inside the smartphone 300, a voltage of the battery 314, etc. The operation data obtainer 112 is capable of retrieving, for a predetermined time period, operation data every constant time interval. The procedure for the internal temperature data obtainer 110a to obtain the internal temperature data and the procedure for the operation data obtainer 112a to obtain the operation data are described below.

The estimation formula storage 130 stores an estimation formula for calculating an estimated value of the external temperature in a vicinity of the smartphone 300 based on the internal temperature data and the operation data of the smartphone 300. The temperature estimator 114 calculates an estimated value of the external temperature in the vicinity of the smartphone 300 by applying the internal temperature data and the operation data of the smartphone 300 to an estimation formula stored in the estimation formula storage 130.

The temperature estimator 114 stores the calculated estimated value of the external temperature in the estimated temperature storage 132. The estimated temperature output 116 provides, through a network, the smartphone 300 with the estimated value of the external temperature calculated by the temperature estimator 114. In the smartphone 300, the temperature sensor 316*a* outputs the obtained estimated value of the external temperature, for example, by displaying the obtained estimated value of the external temperature on a display.

Next, a procedure for calculating the estimation formula stored in the estimation formula storage 130 is described.

In the embodiment, the estimation formula may represent correlation among the internal temperature data of the smartphone for measurement, the operation data on an operation state of the smartphone for measurement, and actual temperature data representing an actual environmental temperature in the vicinity of the smartphone for measurement. Specifically, the estimation formula may be obtained by multiple regression analysis, where an outcome variable (a dependent variable) is the "actual temperature data" and predictor variables are the "internal temperature data" and the "operation data." The actual temperature data may be the data obtained by measuring the actual environmental temperature by a thermometer. Alternatively, the actual temperature data may be a controlled temperature under a condition in which the temperature is controlled, such as a thermostatic chamber.

Figure 3:
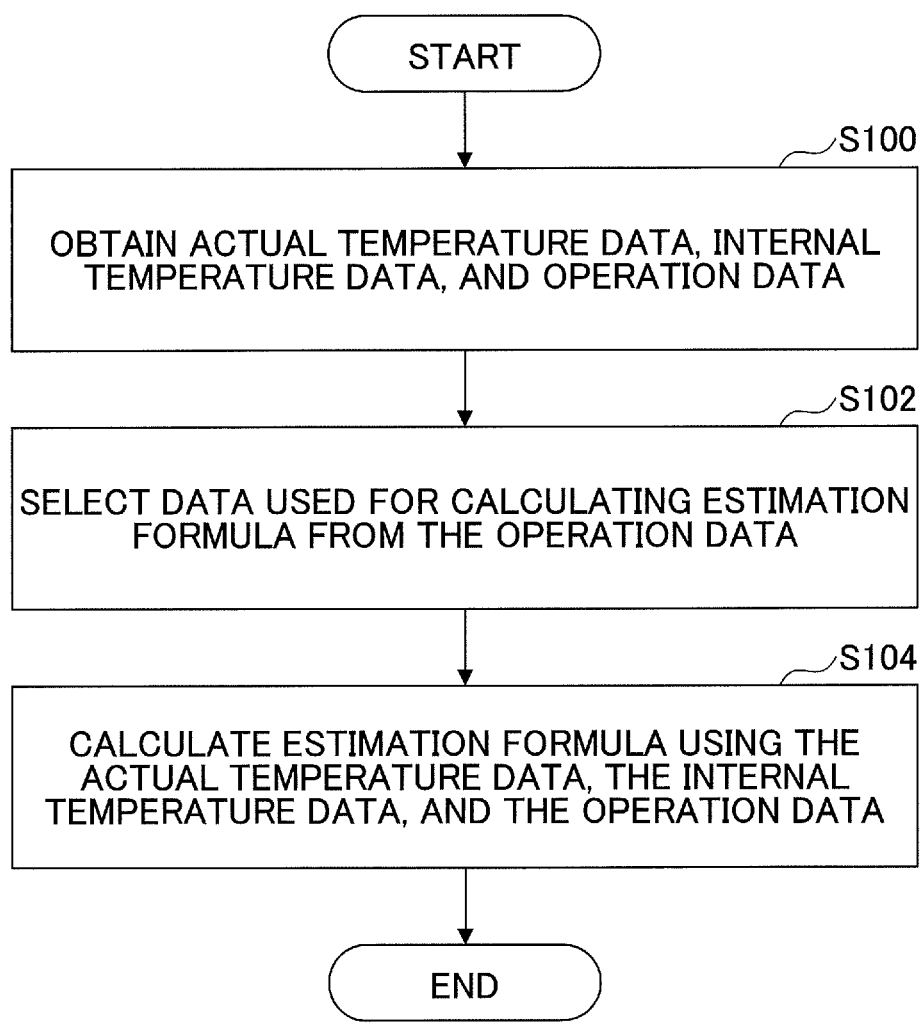
FIG. 3 is a flowchart illustrating an example of a procedure for calculating an estimated formula according to an embodiment.
Figures 4, 5:
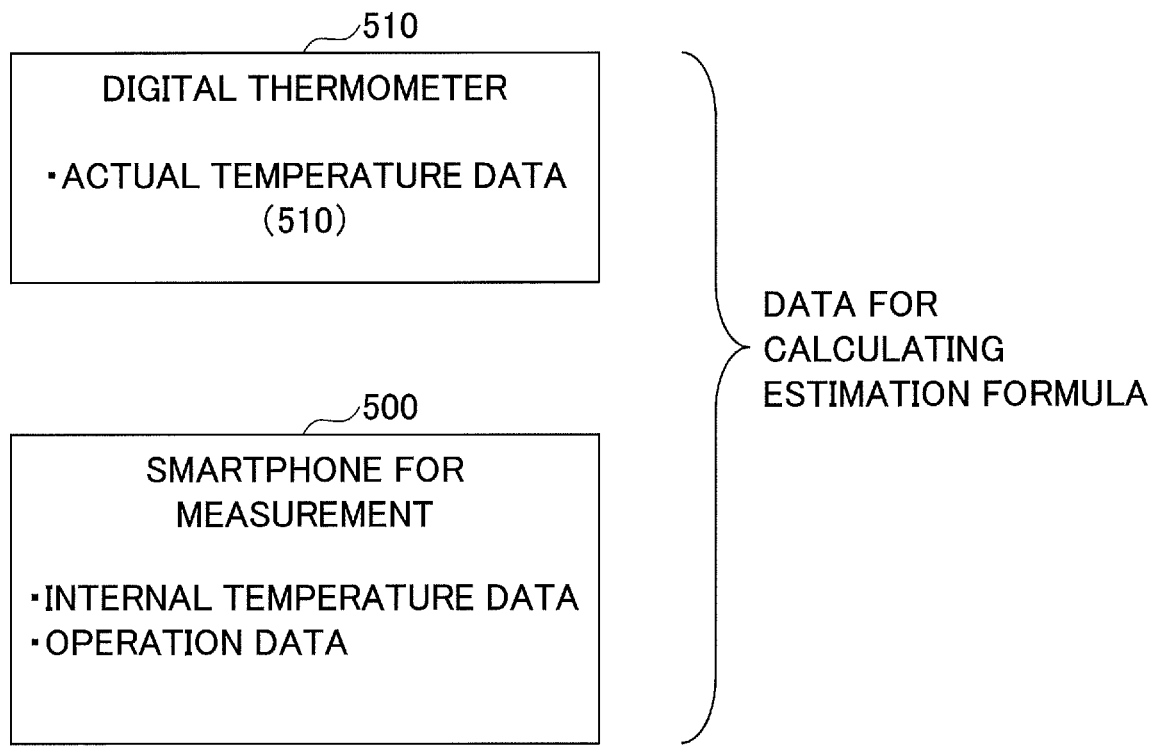
FIG. 4 is a diagram illustrating the example of the procedure for calculating the estimated formula according to the embodiment.
FIG. 5 is a diagram illustrating an example of actual temperature data stored in an actual temperature data storage of a digital thermometer.

FIG. 3 is a flowchart illustrating an example of a procedure for calculating an estimation formula by multiple regression analysis in the embodiment. FIG. 4 is a diagram illustrating the example of the procedure for calculating the estimation formula in the embodiment.

As illustrated in FIG. 3, first, actual temperature data, internal temperature data, and operation data are obtained (step S100). Specifically, as illustrated in FIG. 4, a measurer carries a smartphone for measurement 500 and a digital thermometer 510. As an example, the measurer may carry the digital thermometer 510 while putting the digital thermometer 510 in a chest pocket, etc., or in a pocket in a bag. Then, for a predetermined time period, internal temperature data and operation data of the smartphone for measurement 500 and actual temperature data measured by the digital thermometer 510 are obtained every constant time interval.

It suffices if the digital thermometer 510 is capable of measuring an actual ambient temperature on the spot, and a commercially available one can be used. The digital thermometer 510 has a function for measuring a temperature every constant time interval to obtain the measured temperature while associating the measured temperature with time. A configuration may be adopted such that the temperature and the time obtained by the digital thermometer 510 are stored in an actual temperature data storage 510*a*, which is formed of an internal memory of the digital thermometer 510, for example. Alternatively, a configuration may be adopted such that the temperature and the time obtained by the digital thermometer 510 are sequentially transmitted to a server apparatus, such as the server apparatus 200.

A hardware configuration of the smartphone for measurement 500 may be the same as the hardware configuration of the smartphone 300, which is described by referring to FIG. 2. Here, for the purpose of explanation, the smartphone for measurement 500 is denoted as the "smartphone for measurement." However, the smartphone for measurement 500 may be the same smartphone as the smartphone 300.

As described above, for example, for a smartphone operating on an Android (registered trademark) platform, various sensors are defined, such as an acceleration sensor (TYPE_ACCELEROMETER), a gyro sensor (TYPE_GYROSCOPE), and a temperature sensor (TYPE_TEMPERATURE, TYPE_AMBIENT_TEMPERATURE). Values measured by these sensors can be obtained using an API, such as a sensor framework. The internal temperature data of the smartphone for measurement 500 can be obtained by using an API, such as the sensor framework.

Additionally, in a smartphone operating on an Android (registered trademark) platform, a battery voltage (voltage) and a temperature (temperature) can be obtained using, for example, a predetermined source code using a BroadcastReceiver class and a BatteryManager class.

The internal temperature data and the battery voltage, as the operation data, of the smartphone for measurement 500 can be obtained by such a source code.

Additionally, in a smartphone operating on an Android (registered trademark) platform, CPU information can be obtained using a predetermined source code for reading out /proc/cupinfo and /proc/stat on a file system. Here, as the CPU information, data of /proc/stat may be used, and a plurality of data items may be obtained (which are referred to as CPU1 through CPUn below (n is an integer greater than or equal to 2)).

The CPU information, as the operation data of the smartphone for measurement 500, can be obtained by such a source code.

Similar to the smartphone 300, the smartphone for measurement 500 includes, as functional components, the internal temperature data obtainer 110*a* and the operation data obtainer 112*a*. The internal temperature data obtainer 110*a* obtains, for a predetermined time period, the internal temperature data every constant time interval using the above-described API, a predetermined source code, etc.; and the operation data obtainer 112*a* obtains, for the predetermined time period, the operation data every constant time interval using the above-described API, a predetermined source code, etc.

Here, the process of calculating the estimation formula by multiple regression analysis is described by exemplifying a case in which the process is executed by the server apparatus 200, though the process is not necessarily executed by the server apparatus 200. The data obtainer (see FIG. 9 and FIG. 10) of the server apparatus 200 obtains the actual temperature data associated with the date and time from the digital thermometer 510. Additionally, the internal temperature data obtainer 110 of the server apparatus 200 obtains, from the internal temperature data obtainer 110*a* of smartphone for measurement 500, the internal temperature data of the smartphone for measurement 500 that is associated with the date and time; and the operation data obtainer 112 of the server apparatus 200 obtains, from the operation data obtainer 112*a* of the smartphone for measurement 500, the operation data of the smartphone for measurement 500 that is associated with the date and time. The actual temperature data, the internal temperature data, and the operation data, which are obtained by the server apparatus 200, are stored in a storage of the server apparatus 200 (e.g., the data accumulator 230 of the server apparatus 200 (see FIG. 9 and FIG. 10) described below). In the following, the data collected for calculating the estimation formula is also referred to as "estimation formula calculation data."

FIG. 5 is a diagram illustrating an example of the actual temperature data obtained by the digital thermometer 510. The actual temperature data associated with date and time is obtained.

FIG. 6 is a diagram illustrating an example of the internal temperature data and the operation data, which are obtained for the smartphone for measurement 500. The internal temperature data and the operation data (CPU1 through CPU 3, VOLT) associated with date and time are obtained.

Referring back to FIG. 3, at step S104, an estimation formula for calculating an estimated value of the external temperature in the vicinity of the smartphone is calculated using the actual temperature data, the internal temperature data, and the operation data. As described above, in the embodiment, the estimation formula can be calculated by multiple regression analysis with the "actual temperature data" as the outcome variable (the dependent variable), and the "internal temperature data" and the "operation data" as the predictor variables.

Additionally, as described in the embodiment, if there are multiple types of operation data, data with a high correlation coefficient with the actual temperature data can be selected to be used (step S102).

As described above, when the battery voltage and the CPU information are obtained in the smartphone operating on the Android (registered trademark) platform by using the predetermined source code, a plurality of data items, such as VOLT, and CPU1 through CPUn (n is an integer greater than or equal to 2), is obtained as the operation data. Here, the implication of the values that are obtained as the CPU information, such as CPU1 through CPUn (n is an integer greater than or equal to 2), is not clarified. However, by selectively using the operation data that is highly likely to affect the "actual temperature data," an estimation formula can be obtained with which an estimated value of the external temperature can be accurately calculated.

Various types of existing statistical analysis software can be used for calculating the estimation formula (multiple regression analysis) and for calculating correlation coefficients. For example, the statistical analysis software "R," SPSS, etc., can be used.

In the process of step S102, prior to performing the multiple regression analysis of step S103, correlation coefficients between the operation data items and the actual temperature data may be calculated, and the operation data item with a high correlation coefficient with the actual temperature data may be selected; or a predetermined number of the operation data items may be selected in a descending order of the correlation coefficients.

As another example, the process at step S102 and the process at step S103 may be simultaneously performed. Namely, first, preliminary multiple regression analysis may be performed with the obtained all the operation data items and the internal temperature data as the predictor variables and the actual temperature data as the outcome variable. Based on the result, for example, based on the correlation coefficients and the significance levels, an operation data item that causes large effect on the actual temperature data is selected from the operation data items Subsequently, an estimation formula can be calculated by performing, again, the multiple regression analysis with the selected operation data item and the internal temperature data as the predictor variables and the actual temperature data as the outcome variable.

The process of selecting an appropriate operation data item from the plurality of types of operation data items may be appropriately performed based on the statistical analysis.

Furthermore, in addition to using, as the operation data items, for example, the values of the above-described CPU information and the battery voltage as they are, for example, differences, etc., among different types of operation data items may be used as the operation data items. Specifically, for example, a value obtained as (CPU1-CPU2) may be used as a type of the operation data item. In this case, considering the correlation coefficients with the actual temperature data, an operation data item that causes large effect on the actual temperature data may be used as the operation data.

As described above, for example, when a process with a high load is executed in the smartphone, the temperature of the battery and the CPU rises, and the temperature measured by the temperature sensor installed inside the smartphone may become higher than the actual external temperature. In the embodiment, the estimation formula is calculated by adding, to the predictor variables, the CPU information, the battery voltage, etc., as the operation data on the operation state of the smartphone. As a result, according to the estimation formula in the embodiment, even if, for example, the operation state of the smartphone is highly busy and the internal temperature of the smartphone rises above the external temperature, an estimated value of the external temperature can be calculated which reflects the operation state of the smartphone and which is lower than the internal temperature.

Figure 7:
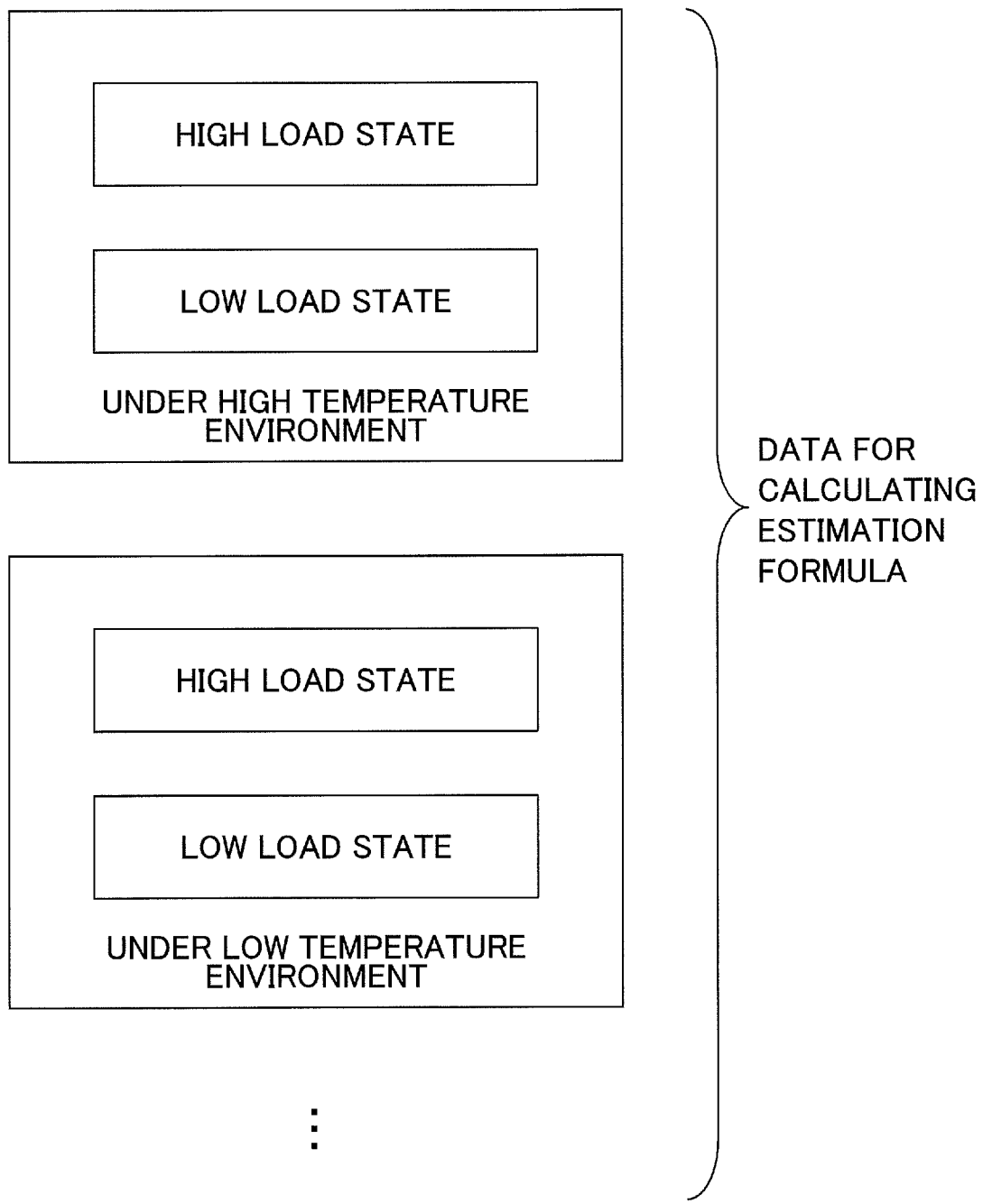
FIG. 7 is a diagram illustrating an example of estimated formula calculation data for calculating the estimated formula.

FIG. 7 is a diagram illustrating an example of the estimation formula calculation data for calculating the estimation formula. As illustrated in FIG. 7, the estimation formula can be calculated based on the relation among the internal temperature data, the operation data, and the actual temperature data that are obtained over a period including a plurality of states respectively corresponding to different operation states of the smartphone for measurement 500.

Additionally, the estimation formula can be calculated based on the relation among the internal temperature data, the operation data, and the actual temperature data that are obtained for a plurality of time periods respectively corresponding to different environmental states, which correspond to different average temperatures, such as different seasons.

As described by referring to FIG. 4, a measurer carries the smartphone for measurement 500 and the digital thermometer 510 to obtain the internal temperature data, the operation data, and the actual temperature data. The measurer can obtain the internal temperature data, the operation data, and the actual temperature data, for example, during a low load state in which no application of the smartphone for measurement 500 is used, and during a high load state in which predetermined application (movie playback application, music playback application, net radio application, etc.) with a large load is used. The estimation formula can be calculated using these data items as the estimation formula calculation data.

Additionally, the internal temperature data, the operation data, and the actual temperature data can be obtained during a plurality of time periods respectively corresponding to different environmental states, such as a high temperature environment with high temperature in summer and a low temperature environment with low temperature in winter. The estimation formula can be calculated using these data items as the estimation formula calculation data. Here, the data items under such different environmental conditions may also be obtained under a condition in which the temperature and humidity can be controlled, such as a thermostatic chamber in a laboratory. At this time, the controlled temperature can be used as the actual temperature data.

As described above, the accuracy of the estimation formula can be enhanced by calculating the estimation formula using the data items that are obtained under different conditions, as the estimation formula calculation data, and estimated values of the external temperature can be accurately calculated under various conditions.

Referring back to FIG. 1, in the embodiment, the internal temperature data obtainer 110a of the smartphone 300 can obtain the internal temperature data of the smartphone 300 using the above-described predetermined source code, for example. Additionally, the internal temperature data obtainer 110a may obtain the internal temperature data of the smartphone 300 using an API, such as the above-described sensor framework.

In the embodiment, the operation data obtainer 112a of the smartphone 300 can obtain the battery voltage (VOLT) as the operation data of the smartphone 300 using the above-described predetermined source code, for example. Additionally, the operation data obtainer 112a can obtain the CPU information as the operation data of the smartphone 300 using the above-described predetermined source code, for example.

Figure 8:
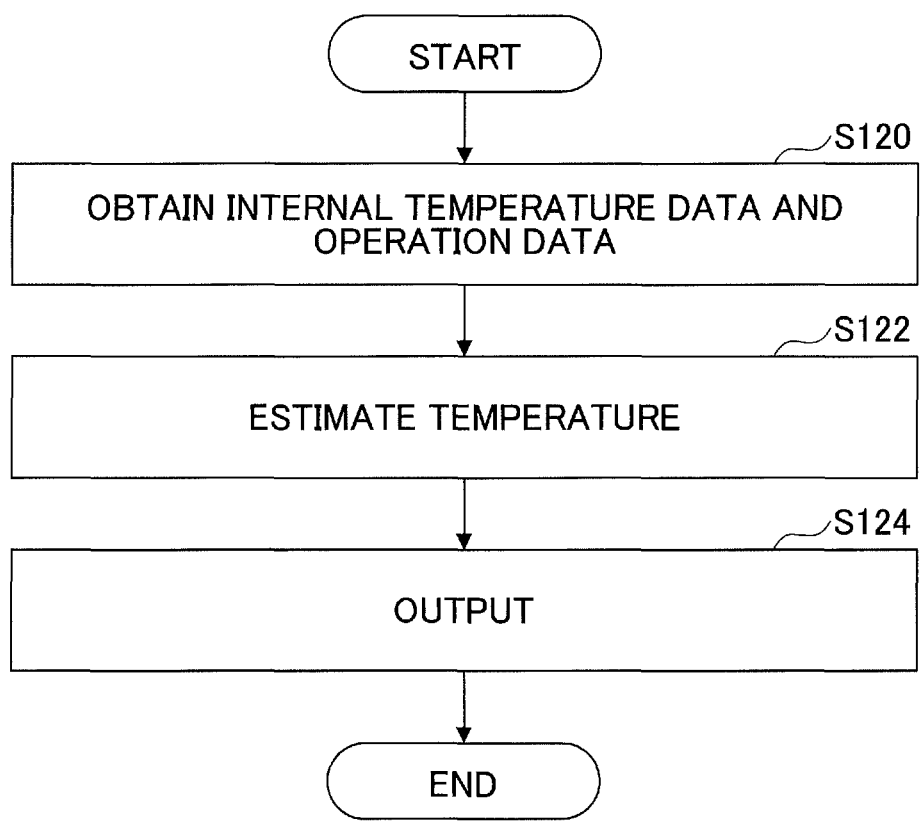
FIG. 8 is a flowchart illustrating an example of a process by the temperature estimation system according to an embodiment.

FIG. 8 is a flowchart illustrating an example of a process by the temperature estimation system 100 according to the embodiment.

The internal temperature data obtainer 110 obtains the internal temperature data while associating the internal temperature data with the date and time; and the operation data obtainer 112 obtains the operation data while associating the operation data with the date and time (step S120). The temperature estimator 114 sequentially applies the internal temperature data and the operation data that are associated with the same date and time to the estimation formula stored in the estimation formula storage 130, and the temperature estimator 114 calculates an estimated value of the external temperature in the vicinity of the smartphone 300 at that date and time (step S122).

The estimated temperature output 116 provides, through a network, the smartphone 300 with the estimated value of the external temperature calculated by the temperature estimator 114. In the smartphone 300, the sensor 316 outputs the obtained estimated value of the external temperature, for example, by displaying the obtained estimated value of the external temperature on a display (step S124). The process from step S120 to step S124 can be executed substantially in real time. As a result, the user can be aware of the temperature at a point at which the user is located. Additionally, the temperature estimator 114 may store the estimated values of the external temperature that are continuously calculated at step S122 for a predetermined time period, while associating the estimated values of the external temperature with the date and time. With such a configuration, the estimated values of the external temperature at the point at which the user is located can be continuously stored for a predetermined time, and the estimated values of the external temperature can be used as environmental data on the skin, for example.

Note that, in FIG. 1, only one smartphone 300 is depicted. However, the server apparatus 200 may be configured such that the server apparatus 200 is connected to a plurality of smartphones 300 through a network. Additionally, the estimated temperature output 116 can calculate, for each of the plurality of smartphones 300, an estimated value of the external temperature. The process related to each smartphone 300 is performed while associating the process with identification information (ID) of the smartphone 300. In this case, the estimated temperature storage 132 stores the estimated value of the external temperature calculated for each of the plurality of smartphones 300 while associating the estimated value of the external temperature with the identification information of the smartphone 300.

Though it is not depicted, the temperature estimation system 100 (the server apparatus 200) may further include a location information obtainer for obtaining location information of each smartphone 300. With such a configuration, in the server apparatus 200, an estimated value of the external temperature at a specific location can be detected based on the estimated value of the external temperature and the location information of each smartphone 300. Additionally, by detecting the estimated value of the external temperature of each of the plurality of smartphones 300 while associating the estimated value of the external temperature and the location information, the estimated values of the external temperature at a plurality of locations can be used.

Second Embodiment

Figure 9:
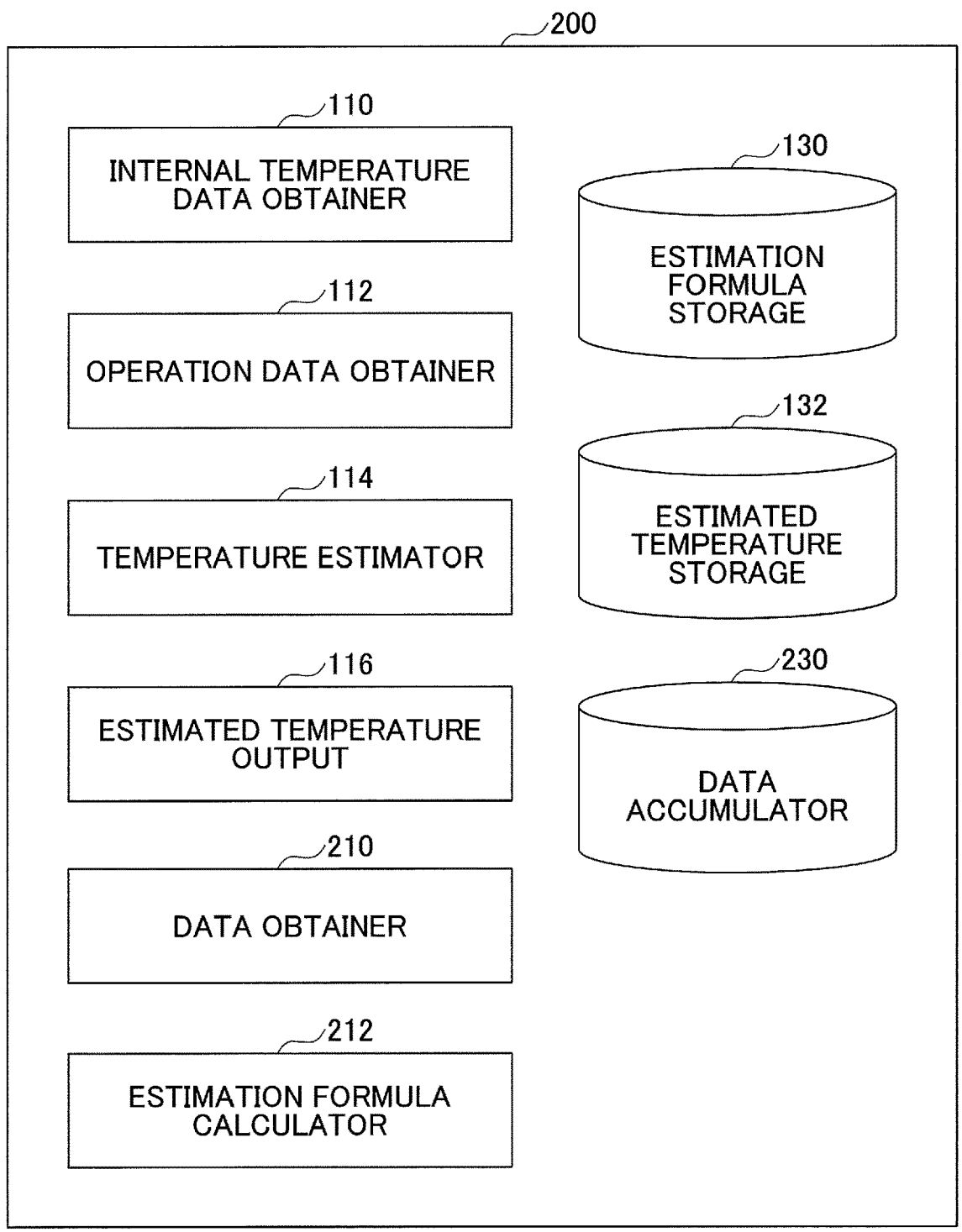
FIG. 9 is a block diagram illustrating an example of a functional configuration of the temperature estimation system according to an embodiment.

Furthermore, the estimation formula calculation data for calculating the estimation formula can be sequentially accumulated, and, based on the accumulated estimation formula calculation data, the estimation formula can be sequentially updated. FIG. 9 is a block diagram illustrating an example of a functional configuration of the temperature estimation system 100 according to the embodiment.

In the embodiment, the temperature estimation system 100 (the server apparatus 200) further includes, in addition to the functional configuration illustrated in FIG. 1, the data obtainer 210; an estimation formula calculator 212; and a data accumulator 230.

The data obtainer 210 obtains the estimation formula calculation data. The estimation formula calculation data can be obtained, for example, by the following procedure. Digital thermometers 510, such as that described by referring to FIG. 4 in the first embodiment, are distributed to a plurality of users. Each user carries the user's smartphone (e.g., the smartphone 300) and the digital thermometer 510 to obtain the estimation formula calculation data. The data obtainer 210 obtains, from the digital thermometer 510 and the smartphone, etc., of each user, the actual temperature data, the internal temperature data, and the operation data. The data obtainer 210 stores the obtained estimation formula calculation data in the data accumulator 230.

The estimation formula calculator 212 calculates (updates) the estimation formula based on the estimation formula calculation data stored in the data accumulator 230. Upon detecting that the data obtainer 210 obtains new estimation formula calculation data, the estimation formula calculator 212 calculates the estimation formula again by adding the newly obtained estimation formula calculation data to update the estimation formula. The estimation formula calculator 212 stores the calculated estimation formula in the estimation formula storage 130. As a result, the estimation formula in the estimation formula storage 130 is updated.

In general, accuracy of statistical data increases, as the sample size increases. According to the configuration of the temperature estimation system 100 according to the embodiment, the estimation formula can be updated by increasing the sample size, and the accuracy of the estimation formula can be enhanced.

Third Embodiment

Figure 10:
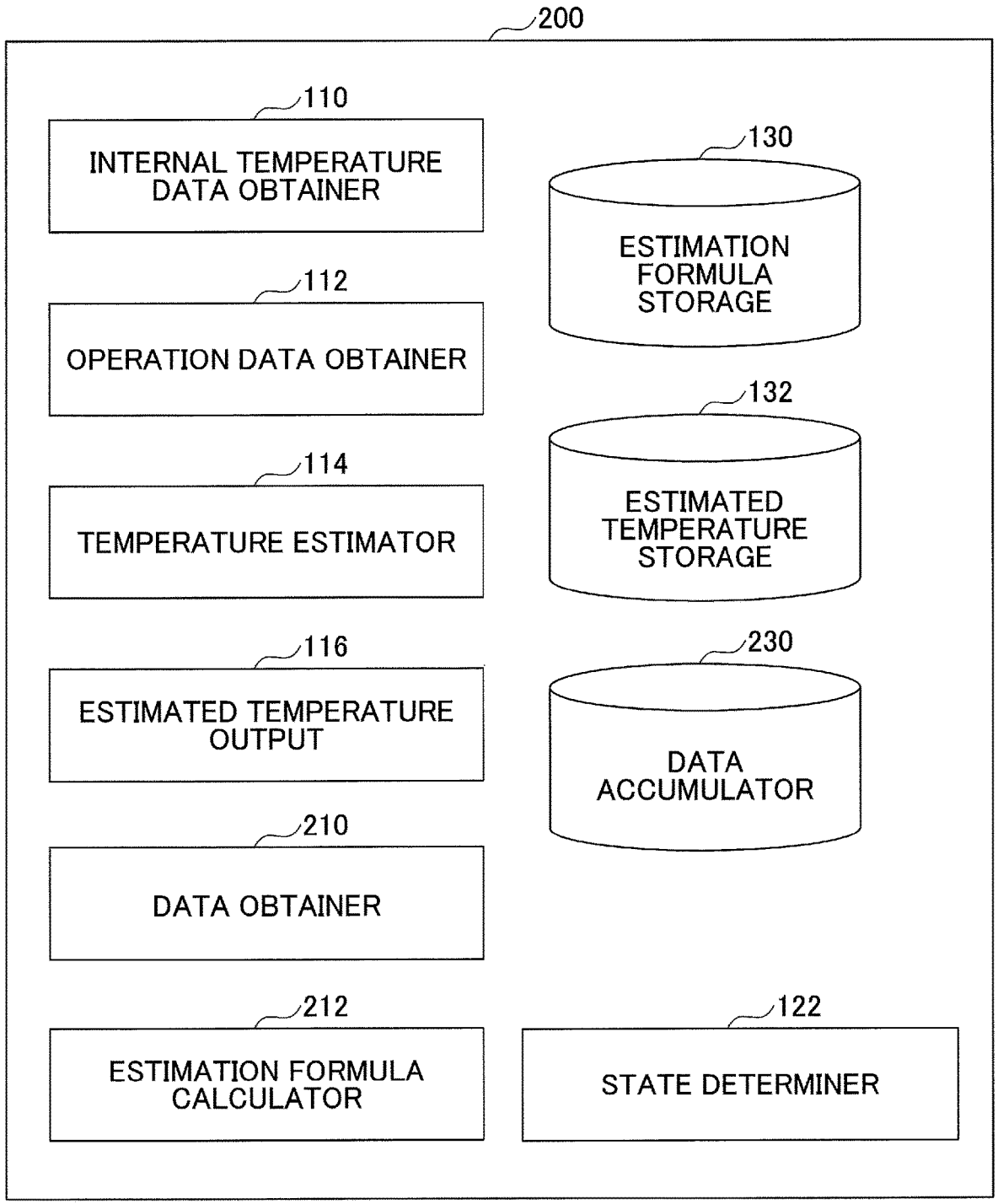
FIG. 10 is a block diagram illustrating an example of a functional configuration of the temperature estimation system according to the embodiment.

The estimation formula can be prepared for each state of the smartphone, such as the operation state and the environmental state of the smartphone. Depending on the state of the smartphone 300, such as the operation state and the environmental state of the smartphone 300, an estimated value of the external temperature can be calculated using the corresponding estimation formula. FIG. 10 is a block diagram illustrating an example of the functional configuration of the temperature estimation system 100 according to the embodiment.

In the embodiment, the temperature estimation system 100 further includes, in addition to the functional configuration illustrated in FIG. 9, a state determiner 122. The state determiner 122 determines the state of the smartphone 300, such as the operation state and the environmental state of the smartphone 300, for estimating the external temperature, based on the data obtained by the internal temperature data obtainer 110 and the operation data obtainer 112. The operation state of the smartphone 300 may be, for example, a high load state or not, and the operation state of the smartphone 300 can be determined, for example, based on whether predetermined application is used. Additionally, the operation state can be determined based on a value of a predetermined operation data item of the operation data that is obtained by the operation data obtainer 112. The environmental state can be determined, for example, based on whether the season is summer or winter.

In the embodiment, the estimation formula calculation data may be configured to include a state, such as an operation state and an environmental state of the smartphone at a time of obtainment. FIG. 11 is a diagram illustrating an example of an internal structure of the data accumulator 230 in which the estimation formula calculation data is stored. In the data accumulator 230, the estimation formula calculation data includes the date and time; the actual temperature data; the internal temperature data; and the operation data (CPU1 through CPU3, VOLT), and a state, such as the operation state and the environmental state, is associated with the estimation formula calculation data.

In the embodiment, the estimation formula can be calculated for each state using the estimation formula calculation data for the corresponding state. For example, the estimation formula for high-load/high-temperature can be calculated by performing multiple regression analysis similar to that described by referring to FIG. 3 through FIG. 6 using the actual temperature data, the internal temperature data, and the operation data that are associated with high-load/high-temperature. Similarly, for example, the estimation formula for low-load/high-temperature, the estimation formula for high-load/low-temperature, the estimation formula for low-load/low-temperature, etc., can be calculated. Additionally, the estimation formula can be calculated by separating, for example, the estimation formula for high-load from the estimation formula for low-load; or the estimation formula for high-temperature from the estimation formula for low-temperature.

Figure 12:
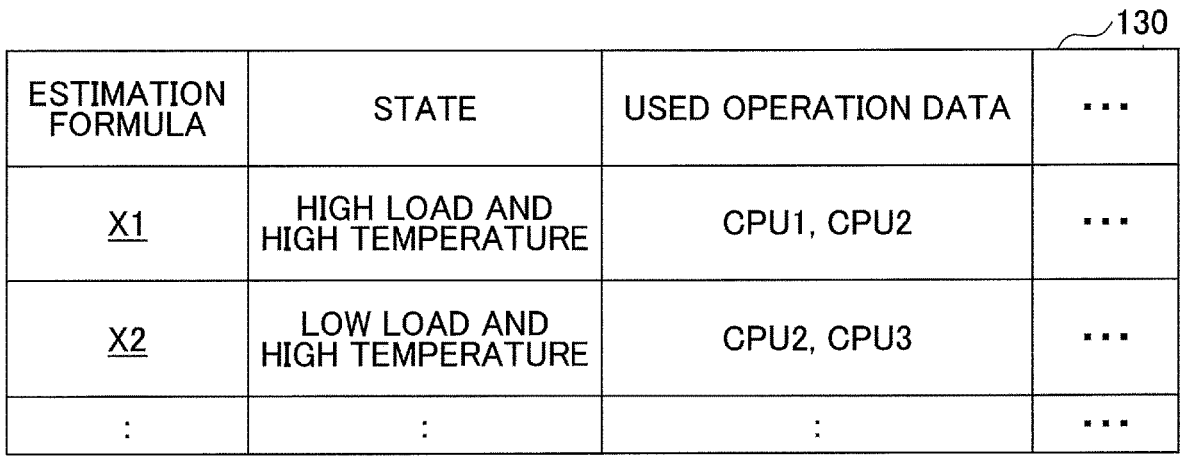
FIG. 12 is a diagram illustrating an example of an internal structure of an estimation formula storage.

FIG. 12 is a diagram illustrating an example of the internal structure of the estimation formula storage 130. In the estimation formula storage 130, a plurality of estimation formulas X1, X2, etc., are stored while the estimation formulas are associated with respective states. Additionally, the operation data used for each estimation formula can be stored while associating the operation data with the estimation formula.

Figure 13:
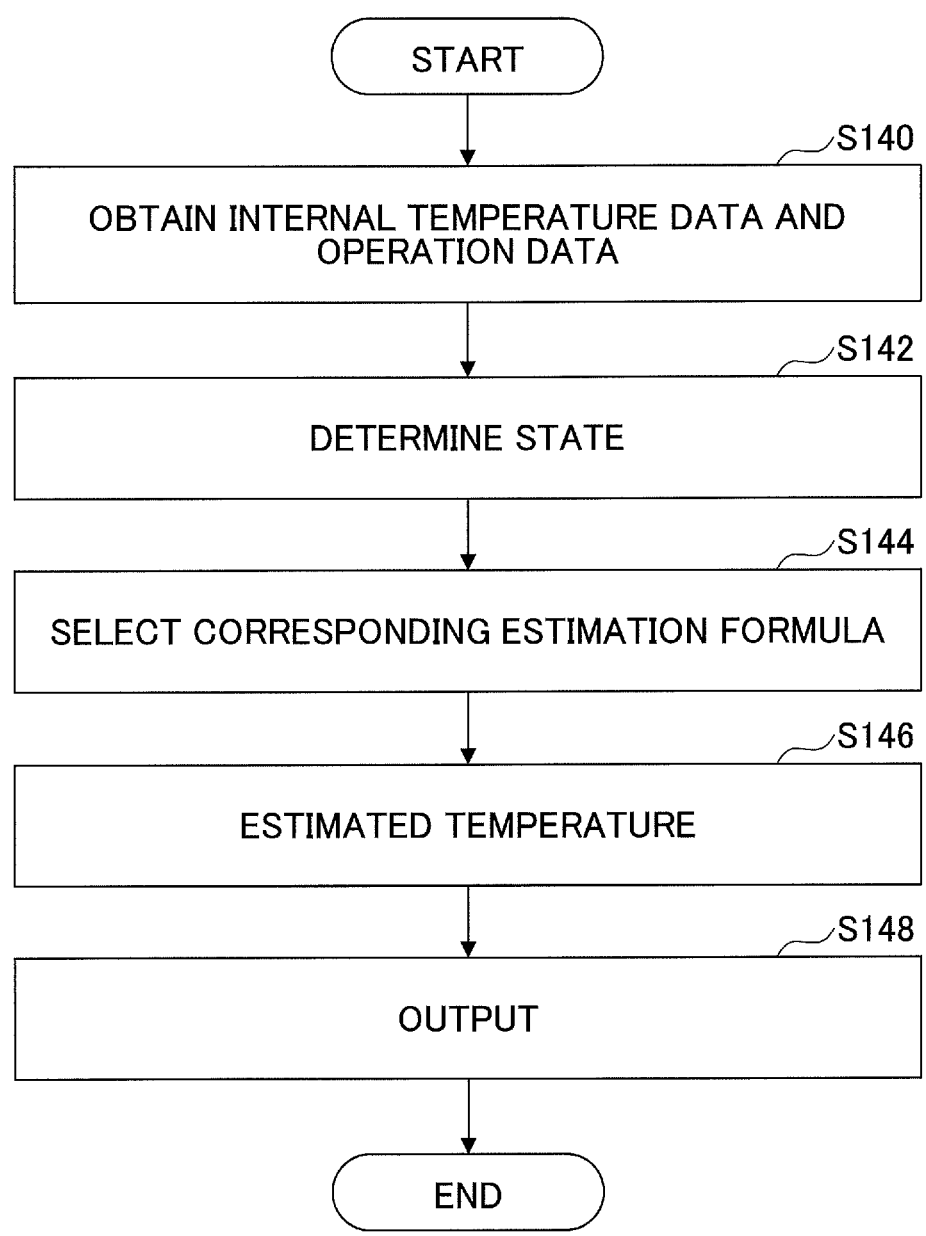
FIG. 13 is a flowchart illustrating an example of a process by the temperature estimation system according to an embodiment.

FIG. 13 is a flowchart illustrating an example of a process by the temperature estimation system 100 according to the embodiment.

The internal temperature data obtainer 110 obtains the internal temperature data while associating the internal temperature data with date and time, and the operation data obtainer 112 obtains the operation data while associating the operation data with the date and time (step S140). The state determiner 122 determines the operation state and the environmental state, etc., of the smartphone 300 at the date and time of the internal temperature data and the operation data obtained by the internal temperature data obtainer 110 and the operation data obtainer 112 (step S142). The temperature estimator 114 selects an estimation formula corresponding to the state determined by the state determiner 122 (step S144), and the temperature estimator 114 calculates, using the estimation formula, an estimated value of the external temperature in the vicinity of the smartphone 300 at the corresponding date and time (step S146).

Note that the process at step S140 and step S142 can be executed substantially in real time.

With the configuration of the temperature estimation system 100 according to the embodiment, the estimation formulas can be selectively used depending on the state, and the estimated value of the external temperature can be more accurately calculated.

Example

The estimation formula calculation data was collected by actually using the smartphone (GALAXY Note) and the digital thermometer in accordance with the procedure described by referring to FIG. 4 during five days between March 2016 and May 2016. Here, for each of the high load state in which application, such as Youtube and TuneInradio, was used and the low load state in which no application was used, the estimation formula calculation data was collected at a room temperature and at a low temperature environment in which the smartphone was placed in a refrigerator.

As the operation data, the battery voltage (VOLT) and the CPU information (CPU1 through CPU7) were obtained. Among these, the five types with high correlation coefficients with the actual temperature data, namely, the battery voltage (VOLT) and the CPU information (CPU1, CPU4, CPU6, CPU7), were used for the calculation of the estimation formula. The calculation of the correlation coefficients and the multiple regression analysis were performed using statistical analysis software "R." As a result, the following estimation formula was obtained.

$$\text{(Estimated value of the external temperature)}= -1.88E{+}01{+}3.40E{-}01{\times}(\text{the internal temperature data}){+}8.69E{-}03{\times}(\text{VOLT}){-}1.56E{-}05{\times}(\text{CPU1}){-}1.72E{-}07{\times}(\text{CPU4}){+}1.02E{-}01{\times}(\text{CPU6}){+}3.01E{-}05{\times}(\text{CPU7}) \quad (1)$$

Additionally, separately from the collection of the estimation formula calculation data, the internal temperature data, the operation data, and the actual temperature data were collected using the same smartphone (GALAXY Note) and the digital thermometer. Here, the data collection was performed at a room temperature for each of the high load state in which application, such as Youtube and TuneInradio, was used in the smartphone and the low load state in which no application was used. The estimated value of the external temperature was calculated by applying the collected internal temperature data and the operation data (VOLT, CPU1, CPU4, CPU6, and CPU7) to the formula (1).

FIG. 14 is a diagram illustrating the estimated values of the external temperature, which are calculated from the collected internal temperature data, the collected actual temperature data, and the formula (1). As shown in FIG. 14, even if the smartphone is in the high load state, the estimated value of the external temperature is approximately equal to the actual temperature, and the external temperature of the smartphone can be accurately estimated.

With the temperature estimation system 100 in the embodiment, the external temperature of the mobile terminal device can be accurately estimated using data that can be standardly obtained by the mobile terminal device, such as the smartphone.

The embodiments of the present invention are described above by referring to the drawings. However, these are exemplification of the present invention, and various configurations other than the above-described configurations may be adopted.

Each component of the temperature estimation system 100 illustrated in FIG. 1, FIG. 9, and FIG. 10 shows a functional unit block, which is not a hardware unit configuration. Each components of the temperature estimation system 100 is implemented by a combination of hardware and software, which mainly include one or more computer CPUs; a memory; a program loaded on the memory for implementing a component of the drawings; a storage unit, such as a hard disk for storing the program; and an interface for network connection. A person ordinarily skilled in the art will appreciate that there are various modifications to the implementation methods and the devices.

For example, in FIG. 1, the configuration is illustrated as the example in which the functional configuration of the temperature estimation system 100 is embedded in the server apparatus 200. However, the functional configuration of the temperature estimation system 100 illustrated in FIG. 1 may be provided in the smartphone 300. A part of the functional configuration of the temperature estimation system 100 described in the embodiments above may be provided in the smartphone 300, and the remainder may be provided in the server apparatus 200.

For example, the smartphone 300 may be configured to include the temperature estimator 114 and the estimation formula storage 130, and the configuration may be such that the estimated value of the external temperature is calculated by the smartphone 300. Alternatively, for example, the smartphone 300 may include the temperature estimator 140, and the configuration may be such that, depending on necessity, the estimation formula stored in the estimation formula storage 130 is retrieved from the server apparatus 200, and the estimated value of the external temperature is calculated by the smartphone 300. In this case, the server apparatus 200 may retrieve, for each of the plurality of smartphones 300, the estimated value of the external temperature of the smartphone 300 while associating the estimated value of the external temperature of the smartphone 300 with the corresponding identification information, and the server apparatus 200 may store, in the estimated temperature storage 132, the estimated value of the external temperature of each smartphone 300 while associating the estimated value of the external temperature of the smartphone 300 with the corresponding identification information.

Furthermore, the configuration of the internal temperature data obtainer 110a and the operation data obtainer 112a of the smartphone 300 to obtain the internal temperature data and the operation data of the smartphone 300 is not limited to the above-described procedure using the API, the predetermined source code, etc., and various configurations may be adopted, such as a configuration in which the internal temperature data obtainer 110a directly obtains the internal temperature data measured by the temperature sensor 316a.

Furthermore, a configuration may be such that, if the internal temperature data and the operation data of the smartphone 300 are accumulated in a predetermined external server, the internal temperature data obtainer 110 and the operation data obtainer 112 of the server apparatus 200 directly obtain the internal temperature data and the operation data of the smartphone 300 using the above-described API, the predetermined source code, etc.

In the embodiments above, the smartphone operating on the Android (registered trademark) platform is described as the example. However, if a mechanism is provided with which the internal temperature data and the operation data can be obtained in the same manner, the internal temperature data and the operation data can be obtained by a similar process by a smartphone with another OS as a platform.

In the embodiments above, the examples are illustrated in which the estimation formula is calculated using the multiple regression analysis. However, the embodiments are not limited to the multiple regression analysis, and the correlation among the internal temperature data, the operation data, and the actual temperature data can be represented by formulas or models using various statistical analysis methods, etc.

In the third embodiment, an example is illustrated in which an estimation formula is prepared for each state, and an estimation formula is selected depending on a state. Similarly, an estimation formula may be prepared for each type and for each model of the mobile terminal device, and an estimation formula to be used may be selected depending on the type and the model of the mobile terminal device.

This international application is based on and claims priority to Japanese Patent Application No. 2016-172246, filed on Sep. 2, 2016, and the entire content of which is hereby incorporated by reference.

DESCRIPTION OF THE REFERENCE NUMERALS 100 temperature estimation system
110 internal temperature data obtainer
112 operation data obtainer
114 temperature estimator
116 estimated temperature output
116a estimated temperature output
122 state determiner
130 estimation formula storage
132 estimated temperature storage
200 server apparatus
210 data obtainer
212 estimation formula calculator
230 data accumulator
300 smartphone
314 battery
316a temperature sensor
500 smartphone for measurement
510 digital thermometer

The invention claimed is:
1. A temperature estimation system comprising:
a processor;
a display; and a memory that includes instructions, which when executed, cause the processor to execute the following steps:

obtaining internal temperature data of a user mobile terminal device carried by a user;

obtaining operation data on an operation state of the user mobile terminal device;

calculating an estimated value of an external temperature in a vicinity of the user mobile terminal device from the internal temperature data and the operation data of the user mobile terminal device, based on correlation among internal temperature data of a mobile terminal device for measurement, operation data on an operation state of the mobile terminal device for measurement, and actual temperature data that represents an actual environmental temperature in a vicinity of the mobile terminal device for measurement, and causing the display to display the estimated value of the external temperature in the vicinity of the user mobile terminal device, wherein the processor is capable of calculating the estimated value of the external temperature in the vicinity of the user mobile terminal device irrespective of an internal temperature of the mobile terminal device.

2. The temperature estimation system according to claim 1, wherein the correlation is represented by a formula or a model, and the calculating calculates the estimated value of the external temperature in the vicinity of the user mobile terminal device by applying the internal temperature data and the operation data of the user mobile terminal device to the formula or the model.

3. The temperature estimation system according to claim 2, wherein the formula is an estimation formula obtained by multiple regression analysis.

4. The temperature estimation system according to claim 1, wherein the operation data is selected from a plurality of types of operation data on the operation state of the mobile terminal device for measurement, based on correlation coefficients with the actual temperature data.

5. The temperature estimation system according to claim 1, wherein the correlation is calculated based on relation among the internal temperature data, the operation data, and the actual temperature data that are obtained during a time period including a plurality of states respectively corresponding to different operation states of the mobile terminal device for measurement.

6. The temperature estimation system according to claim 1, wherein the correlation is calculated based on relation among the internal temperature data, the operation data, and the actual temperature data that are obtained during a plurality of time periods respectively corresponding to different temperature states.

7. The temperature estimation system according to claim 1, wherein the internal temperature data is measured by a temperature sensor installed inside each of the mobile terminal device for measurement and the user mobile terminal device.

8. The temperature estimation system according to claim 1, wherein the steps executed by the processor further include storing, in the memory, each of a plurality of correlations while associating the correlation with the operation state of the mobile terminal device for measurement or an environmental state in the vicinity of the mobile terminal device for measurement at a time at which the internal temperature data and the operation data of the mobile terminal device for measurement and the actual temperature data in the vicinity of the mobile terminal device for measurement are obtained; and detecting the operation state of the user mobile terminal device or an environmental state in the vicinity of the user mobile terminal device at a time at which the internal temperature data and the operation data of the user mobile terminal device are obtained, wherein the calculating calculates the estimated value of the external temperature in the vicinity of the user mobile terminal device using the correlation in a state that is the same as the operation state or the environmental state detected by the state detector.

9. The temperature estimation system according to claim 1, wherein the steps executed by the processor further include storing, in the memory, the estimated value of the external temperature that is calculated for each of a plurality of user mobile terminal devices while associating the estimated value of the external temperature calculated for the user mobile terminal device with identification information of the user mobile terminal device.

10. A temperature estimation method executed by a temperature estimation system including a processor: a display; and a memory, the method comprising:

calculating, by the processor, an estimated value of an external temperature in a vicinity of a user mobile terminal device from internal temperature data of the user mobile terminal device carried by a user and operation data on an operation state of the user mobile terminal device, based on correlation among internal temperature data of a mobile terminal device for measurement, operation data on an operation state of the mobile terminal device for measurement, and actual temperature data that represents an actual environmental temperature in a vicinity of the mobile terminal device for measurement, and causing, by the processor, the display to display the estimated value of the external temperature in the vicinity of the user mobile terminal device, wherein the method is capable of calculating the estimated value of the external temperature in the vicinity of the user mobile terminal irrespective of an internal temperature of the mobile terminal device.

11. The temperature estimation method according to claim 10, wherein the correlation is represented by a formula or a model, and the calculating calculates the estimated value of the external temperature in the vicinity of the user mobile terminal device by applying the internal temperature data and the operation data of the user mobile terminal device to the formula or the model.

12. The temperature estimation method according to claim 11, wherein the formula is an estimation formula obtained by multiple regression analysis.

13. The temperature estimation method according to claim 10, wherein the internal temperature data is measured by a temperature sensor installed inside each of the mobile terminal device for measurement and the user mobile terminal device.

14. A non-transitory computer readable recording medium storing a temperature estimation program that causes a computer including a processor, a display, and a memory to execute the following steps:

obtaining, by the processor, internal temperature data of a user mobile terminal device carried by a user;

obtaining, by the processor, operation data on an operation state of the user mobile terminal device;

calculating, by the processor, an estimated value of an external temperature in a vicinity of the user mobile terminal device from the internal temperature data and the operation data of the user mobile terminal device, based on correlation among internal temperature data of a mobile terminal for measurement, operation data on an operation state of the mobile terminal for measurement, and actual temperature data that represents an actual environmental temperature in a vicinity of the mobile terminal device for measurement, and causing, by the processor, the display to display the estimated value of the external temperature in the vicinity of the user mobile terminal device, wherein the calculating is capable of calculating the estimated value of the external temperature in the vicinity of the user mobile terminal device irrespective of an internal temperature of the mobile terminal device.

\* \* \* \* \*